(12) United States Patent
Kawakami (10) Patent No.: US 11,358,866 B2
(45) Date of Patent: Jun. 14, 2022

(54) FIBROUS CARBON NANOSTRUCTURE, METHOD OF EVALUATING FIBROUS CARBON NANOSTRUCTURE, AND METHOD OF PRODUCING SURFACE-MODIFIED FIBROUS CARBON NANOSTRUCTURE

(71) Applicant: ZEON CORPORATION, Tokyo (JP)

(72) Inventor: Osamu Kawakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 61 days.

(21) Appl. No.: 16/770,069

(22) PCT Filed: Nov. 30, 2018

(86) PCT No.: PCT/JP2018/044303
§ 371 (c)(1),
(2) Date: Jun. 5, 2020

(87) PCT Pub. No.: WO2019/124026
PCT Pub. Date: Jun. 27, 2019

(65) Prior Publication Data
US 2020/0385271 A1 Dec. 10, 2020

(30) Foreign Application Priority Data
Dec. 19, 2017 (JP) .............................. JP2017-243244

(51) Int. Cl.
| B32B 9/00 | (2006.01) |
| C01B 32/159 | (2017.01) |
| G01N 5/04 | (2006.01) |
| B82Y 30/00 | (2011.01) |

(52) U.S. Cl.
CPC ............ *C01B 32/159* (2017.08); *G01N 5/04* (2013.01); *B82Y 30/00* (2013.01);
(Continued)

(58) Field of Classification Search
USPC .......................................... 428/408; 423/448
See application file for complete search history.

(56) References Cited

U.S. PATENT DOCUMENTS

| 2005/0079118 A1 | 4/2005 | Maruyama et al. |
| 2008/0318049 A1 | 12/2008 | Hata et al. |

(Continued)

FOREIGN PATENT DOCUMENTS

| CN | 103011130 A | 4/2013 |
| JP | 2007197306 A | 8/2007 |

(Continued)

OTHER PUBLICATIONS

Jun. 23, 2020, International Preliminary Report on Patentability issued in the International Patent Application No. PCT/JP2018/044303.
(Continued)

*Primary Examiner* — Daniel H Miller
(74) *Attorney, Agent, or Firm* — Kenja IP Law PC (57) ABSTRACT

Provided is a fibrous carbon nanostructure that is easy to surface modify. A symmetry factor of a peak of a first derivative curve of a thermogravimetric curve obtained through thermogravimetric analysis of the fibrous carbon nanostructure in a dry air atmosphere is 3.70 or less. The first derivative curve of the thermogravimetric curve can be a temperature derivative curve of the thermogravimetric curve or a time derivative curve of the thermogravimetric curve.

8 Claims, 2 Drawing Sheets

(52) U.S. Cl.
CPC ...... *C01B 2202/02* (2013.01); *C01B 2202/24* (2013.01); *Y10T 428/30* (2015.01)

(56) References Cited

U.S. PATENT DOCUMENTS

| | | | |
|---|---|---|---|
| 2010/0187485 A1* | 7/2010 | Kitano | B82Y 30/00 |
| | | | 252/512 |
| 2012/0326093 A1 | 12/2012 | Landorf | |
| 2016/0229695 A1 | 8/2016 | Yoshiwara | |
| 2016/0251225 A1† | 9/2016 | Takai | |
| 2017/0263946 A1 | 9/2017 | Adu | |

FOREIGN PATENT DOCUMENTS

| | | | |
|---|---|---|---|
| JP | 2014527010 A | 10/2014 |
| KR | 101210577 B1 | 12/2012 |
| KR | 1020160070084 A | 6/2016 |
| WO | 03068676 A1 | 8/2003 |
| WO | 2006011655 A1 | 2/2006 |
| WO | 2008084788 A1 | 7/2008 |
| WO | 2015045418 A1 | 4/2015 |
| WO | 2015064772 A1 | 5/2015 |

OTHER PUBLICATIONS

Feb. 12, 2019, International Search Report issued in the International Patent Application No. PCT/JP2018/044303.
Mansfield, et al., "Applications of TGA in quality control of SWCNTs." Analytical and Bioanalytical Chemistry, Dec. 17, 2009, vol. 396, pp. 1071-1077.†

\* cited by examiner
† cited by third party

FIG. 2

FIBROUS CARBON NANOSTRUCTURE, METHOD OF EVALUATING FIBROUS CARBON NANOSTRUCTURE, AND METHOD OF PRODUCING SURFACE-MODIFIED FIBROUS CARBON NANOSTRUCTURE

TECHNICAL FIELD

The present disclosure relates to a fibrous carbon nanostructure, a method of evaluating a fibrous carbon nanostructure, and a method of producing a surface-modified fibrous carbon nanostructure.

BACKGROUND

Fibrous carbon nanostructures such as carbon nanotubes (hereinafter, also referred to as "CNTs") have been attracting interest in recent years as materials having excellent electrical conductivity, thermal conductivity, and mechanical characteristics.

However, it has been difficult to cause fibrous carbon nanostructures such as CNTs to display the high-level characteristics expected thereof because such fibrous carbon nanostructures readily form bundle structures through Van der Waals forces and the like, and are difficult to disperse in a solvent or resin.

In response, a technique has been proposed for increasing dispersibility of fibrous carbon nanostructures such as CNTs by subjecting the fibrous carbon nanostructures to surface modification treatment such as oxidation treatment (for example, refer to Patent Literature (PTL) 1).

CITATION LIST

Patent Literature

PTL 1: WO 2015/045418 A1

SUMMARY

Technical Problem

From a viewpoint of obtaining surface-modified fibrous carbon nanostructures having excellent dispersibility through surface modification treatment of fibrous carbon nanostructures, it is necessary for the fibrous carbon nanostructures serving as a source material to be well surface modified.

However, there is room for improvement of conventional fibrous carbon nanostructures in terms of further improving ease of surface modification.

Accordingly, an objective of the present disclosure is to provide a fibrous carbon nanostructure that is easy to surface modify.

Another objective of the present disclosure is to provide a surface-modified fibrous carbon nanostructure that has been well surface modified.

Solution to Problem

The inventor conducted diligent studies with the aim of achieving the objective described above. Through these studies, the inventor discovered that a fibrous carbon nanostructure having a specific property is easy to surface modify, and, in this manner, completed the present disclosure.

Specifically, the present disclosure aims to advantageously solve the problem set forth above by disclosing a fibrous carbon nanostructure for which a symmetry factor of a peak of a first derivative curve of a thermogravimetric curve obtained through thermogravimetric analysis in a dry air atmosphere is 3.70 or less. A fibrous carbon nanostructure for which the symmetry factor of a peak of a first derivative curve of a thermogravimetric curve is 3.70 or less is easy to surface modify when subjected to surface modification treatment such as oxidation treatment.

The "symmetry factor of a peak" referred to in the present disclosure can be determined by a method described in the EXAMPLES section of the present specification.

The first derivative curve can be a temperature derivative curve or a time derivative curve of the thermogravimetric curve.

A t-plot for the presently disclosed fibrous carbon nanostructure obtained from an adsorption isotherm preferably exhibits a convex upward shape. This is because a fibrous carbon nanostructure for which a t-plot exhibits a convex upward shape can display particularly good characteristics (for example, electrical conductivity, thermal conductivity, strength, etc.) when dispersibility thereof is increased through surface modification treatment.

The t-plot for the presently disclosed fibrous carbon nanostructure preferably has a bending point within a range of $0.2 \leq t$ (nm)$\leq 1.5$. This is because a fibrous carbon nanostructure for which the bending point of a t-plot is within the range set forth above can display particularly good characteristics (for example, electrical conductivity, thermal conductivity, strength, etc.) when dispersibility thereof is increased through surface modification treatment.

Total specific surface area $S1$ and internal specific surface area $S2$ of the presently disclosed fibrous carbon nanostructure obtained from a t-plot obtained from an adsorption isotherm preferably satisfy a relationship $0.05 \leq S2/S1 \leq 0.30$. This is because a fibrous carbon nanostructure for which $S2/S1$ is within the range set forth above can display particularly good characteristics (for example, electrical conductivity, thermal conductivity, strength, etc.) when dispersibility thereof is increased through surface modification treatment.

The presently disclosed fibrous carbon nanostructure preferably comprises a carbon nanotube, and more preferably comprises a single-walled carbon nanotube. This is because a fibrous carbon nanostructure that includes a carbon nanotube, and particularly a fibrous carbon nanostructure that includes a single-walled carbon nanotube, can display particularly good characteristics (for example, electrical conductivity, thermal conductivity, strength, etc.) when dispersibility thereof is increased through surface modification treatment.

The present disclosure also aims to advantageously solve the problems set forth above by disclosing a method of evaluating a fibrous carbon nanostructure comprising: performing thermogravimetric analysis of a fibrous carbon nanostructure in a dry air atmosphere to obtain a first derivative curve of a thermogravimetric curve; determining a symmetry factor of a peak of the first derivative curve of the thermogravimetric curve; and judging the fibrous carbon nanostructure to be of good quality in a case in which the symmetry factor is 3.70 or less and judging the fibrous carbon nanostructure to be of poor quality in a case in which the symmetry factor is more than 3.70.

Moreover, a presently disclosed method of producing a surface-modified fibrous carbon nanostructure comprises: performing fibrous carbon nanostructure evaluation using the method of evaluating a fibrous carbon nanostructure set forth above; and performing surface modification treatment of a fibrous carbon nanostructure that is judged to be of good quality to obtain a surface-modified fibrous carbon nanostructure.

Advantageous Effect

According to the present disclosure, it is possible to provide a fibrous carbon nanostructure that is easy to surface modify.

Moreover, according to the present disclosure, it is possible to provide a surface-modified fibrous carbon nanostructure that has been well surface modified.

DETAILED DESCRIPTION

The following provides a detailed description of embodiments of the present disclosure.

One or more presently disclosed fibrous carbon nanostructures are easy to surface modify when subjected to surface modification treatment such as oxidation treatment, for example. Moreover, surface-modified fibrous carbon nanostructures obtained through surface modification treatment of the presently disclosed fibrous carbon nanostructures can, without any specific limitations, be suitably used in production of a dispersion liquid having the surface-modified fibrous carbon nanostructures dispersed in a dispersion medium, for example.

(Fibrous Carbon Nanostructures)

It is a requirement for the presently disclosed fibrous carbon nanostructures that a symmetry factor of a peak of a first derivative curve of a thermogravimetric curve obtained through thermogravimetric analysis in a dry air atmosphere is 3.70 or less. As a result of the symmetry factor of the peak of the first derivative curve of the thermogravimetric curve being 3.70 or less, the presently disclosed fibrous carbon nanostructures are well surface modified when subjected to surface modification treatment such as oxidation treatment.

The fibrous carbon nanostructures may, without any specific limitations, be circular tube shaped carbon nanostructures such as carbon nanotubes (CNTs) or non-circular tube shaped carbon nanostructures such as carbon nanostructures resulting from a six-membered ring network of carbon being formed in a flattened tube shape, for example.

Note that the presently disclosed fibrous carbon nanostructures may include one of the types of carbon nanostructures described above or may include two or more of the types of carbon nanostructures described above.

Of the types of carbon nanostructures described above, fibrous carbon nanostructures including CNTs are preferable as the fibrous carbon nanostructures. This is because fibrous carbon nanostructures including CNTs can display particularly good characteristics (for example, electrical conductivity, thermal conductivity, strength, etc.) when dispersibility thereof is increased through surface modification treatment.

Note that the fibrous carbon nanostructures including CNTs may be composed of just CNTs or may be a mixture of CNTs and fibrous carbon nanostructures other than CNTs.

Although single-walled carbon nanotubes and/or multi-walled carbon nanotubes can be used as CNTs in the fibrous carbon nanostructures without any specific limitations, carbon nanotubes having from one to five walls are preferable, and single-walled carbon nanotubes are more preferable. This is because carbon nanotubes having fewer walls can display particularly good characteristics when dispersibility thereof is increased through surface modification treatment.

The symmetry factor of a peak of a first derivative curve of a thermogravimetric curve obtained through thermogravimetric analysis of the presently disclosed fibrous carbon nanostructures in a dry air atmosphere is required to be 3.70 or less. Moreover, the symmetry factor of the peak of the first derivative curve of the thermogravimetric curve is preferably 3.30 or less, more preferably 2.60 or less, and even more preferably 2.00 or less. Furthermore, the symmetry factor of the peak of the first derivative curve of the thermogravimetric curve for the fibrous carbon nanostructures is preferably 0.50 or more, more preferably 0.70 or more, and even more preferably 0.80 or more. When the symmetry factor of the peak of the first derivative curve is within any of the ranges set forth above, the fibrous carbon nanostructures are even easier to surface modify when subjected to surface modification treatment such as oxidation treatment.

Note that the thermogravimetric curve may be a thermogravimetric curve having mass on a vertical axis and temperature on a horizontal axis or may be a thermogravimetric curve having mass on a vertical axis and time on a horizontal axis. Moreover, the first derivative curve of the thermogravimetric curve may be a temperature derivative curve having a derivative thermogravimetric (DTG) value on a vertical axis and temperature on a horizontal axis or may be a time derivative curve having a derivative thermogravimetric (DTG) value on a vertical axis and time on a horizontal axis.

In a case in which the first derivative curve is a temperature derivative curve, the top of the peak of the first derivative curve is normally located within a range of 500° C. to 800° C. Moreover, in a case in which the first derivative curve is a time derivative curve, the top of the peak of the first derivative curve is normally located within a range of 20×v minutes to 36×v minutes, where v (° C./min) is taken to be the heating rate during thermogravimetric analysis (for example, located within a range of 100 minutes to 180 minutes in a situation in which the heating rate is 5° C./min).

The magnitude of the symmetry factor of the peak of the first derivative curve of the thermogravimetric curve for the fibrous carbon nanostructures can be adjusted without any specific limitations by altering the synthesis conditions of the fibrous carbon nanostructures (for example, the composition of a feedstock gas, the type of catalyst used in synthesis, etc.).

The average diameter of the fibrous carbon nanostructures is preferably 1 nm or more, and is preferably 60 nm or less, more preferably 30 nm or less, and even more preferably 10 nm or less. Fibrous carbon nanostructures having an average diameter within any of the ranges set forth above can display particularly good characteristics when dispersibility thereof is increased through surface modification treatment.

The "average diameter of the fibrous carbon nanostructures" referred to in the present disclosure can be determined by measuring the diameters (external diameters) of 20 fibrous carbon nanostructures, for example, in a transmission electron microscope (TEM) image, and then calculating a number-average value of the measured diameters.

The fibrous carbon nanostructures are preferably fibrous carbon nanostructures for which a ratio ($3\sigma$/Av) of a value $3\sigma$ (value obtained by multiplying the diameter standard deviation ($\sigma$: sample standard deviation) by 3) relative to the average diameter (Av) is more than 0.20 and less than 0.60, more preferably fibrous carbon nanostructures for which $3\sigma$/Av is more than 0.25, and even more preferably fibrous carbon nanostructures for which $3\sigma$/Av is more than 0.50. Fibrous carbon nanostructures for which $3\sigma$/Av is more than 0.20 and less than 0.60 can display particularly good characteristics when dispersibility thereof is increased through surface modification treatment.

The average diameter (Av) and the standard deviation ($\sigma$) of the fibrous carbon nanostructures may be adjusted by changing the production method and the production conditions of the fibrous carbon nanostructures, or may be adjusted by combining a plurality of types of fibrous carbon nanostructures obtained by different production methods.

Moreover, the average length of the fibrous carbon nanostructures is preferably 10 μm or more, more preferably 50 μm or more, and even more preferably 80 μm or more, and is preferably 600 μm or less, more preferably 550 μm or less, and even more preferably 500 μm or less. Fibrous carbon nanostructures having an average length within any of the ranges set forth above can display particularly good characteristics when dispersibility thereof is increased through surface modification treatment.

Note that the "average length of the fibrous carbon nanostructures" referred to in the present disclosure can be determined by measuring the lengths of 20 fibrous carbon nanostructures, for example, in a scanning electron microscope (SEM) image, and then calculating a number-average value of the measured lengths.

The fibrous carbon nanostructures normally have an aspect ratio of more than 10. Note that the aspect ratio of the fibrous carbon nanostructures can be determined by measuring the diameters and lengths of 20 randomly selected fibrous carbon nanostructures using a scanning electron microscope or a transmission electron microscope, and then calculating an average value of the ratio of diameter and length (length/diameter).

The BET specific surface area of the fibrous carbon nanostructures is preferably 600 $m^2$/g, or more, and more preferably 800 $m^2$/g or more, and is preferably 2,000 $m^2$/g or less, more preferably 1,800 $m^2$/g or less, and even more preferably 1,600 $m^2$/g or less. When the BET specific surface area of the fibrous carbon nanostructures is 600 $m^2$/g or more, the fibrous carbon nanostructures can display particularly good characteristics when dispersibility thereof is increased through surface modification treatment. Moreover, when the BET specific surface area of the fibrous carbon nanostructures is 2,000 $m^2$/g or less, the dispersibility thereof can be sufficiently increased when surface modification treatment is performed.

A t-plot for the fibrous carbon nanostructures obtained from an adsorption isotherm preferably exhibits a convex upward shape. Fibrous carbon nanostructures for which a t-plot exhibits a convex upward shaped can display particularly good characteristics when dispersibility thereof is increased through surface modification treatment.

Note that a "t-plot" can be obtained by, in an adsorption isotherm of the fibrous carbon nanostructures measured by the nitrogen gas adsorption method, converting the relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructures (t-plot method of de Boer et al.).

In a substance having pores at its surface, the growth of the adsorbed layer of nitrogen gas is categorized into the following processes (1) to (3). The gradient of the t-plot changes in accordance with processes (1) to (3).

(1) A process in which a single molecule adsorption layer of nitrogen molecules is formed over the entire surface (2) A process in which a multi-molecule adsorption layer is formed and is accompanied by capillary condensation filling of pores (3) A process in which a multi-molecule adsorption layer is formed at a surface that appears to be non-porous due to the pores being filled by nitrogen In a t-plot having a convex upward shape, the plot is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that many openings are present in carbon nanostructures constituting the fibrous carbon nanostructures.

A bending point of the t-plot for the fibrous carbon nanostructures is preferably within a range of $0.2 \leq t$ (nm) $\leq 1.5$, more preferably within a range of $0.45 \leq t$ (nm) $\leq 1.5$, and even more preferably within a range of $0.55 \leq t$ (nm) $\leq 1.0$. When the bending point of the t-plot for the fibrous carbon nanostructures is within any of the ranges set forth above, the fibrous carbon nanostructures can display particularly good characteristics when dispersibility thereof is increased through surface modification treatment. The "position of the bending point" is defined as an intersection point of a linear approximation A for the above-described process (1) and a linear approximation B for the above-described process (3).

A ratio (S2/S1) of internal specific surface area S2 relative to total specific surface area S1 obtained from the t-plot for the fibrous carbon nanostructures is preferably not less than 0.05 and not more than 0.30. When the value of S2/S1 of the fibrous carbon nanostructures is within the range set forth above, the fibrous carbon nanostructures can display particularly good characteristics when dispersibility thereof is increased through surface modification treatment.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of the total specific surface area S1 and the internal specific surface area S2 based on t-plot analysis can be performed using a BELSORP®-mini (BELSORP is a registered trademark in Japan, other countries, or both), for example, which is a commercially available measurement apparatus produced by Bel Japan Inc.

Moreover, the fibrous carbon nanostructures including CNTs that are suitable as the fibrous carbon nanostructures preferably have a radial breathing mode (RBM) peak when evaluated by Raman spectroscopy. Note that an RBM is not present in the Raman spectrum of fibrous carbon nanostructures composed of only multi-walled carbon nanotubes having three or more walls.

The fibrous carbon nanostructures including CNTs preferably have a ratio (G/D ratio) of G band peak intensity relative to D band peak intensity in a Raman spectrum of not less than 0.5 and not more than 5.0. When the G/D ratio is not less than 0.5 and not more than 5.0, the fibrous carbon nanostructures can display particularly good characteristics when dispersibility thereof is increased by surface modification treatment.

The carbon purity of the fibrous carbon nanostructures is preferably 98 mass % or more, more preferably 99 mass % or more, and even more preferably 99.9 mass % or more.

(Fibrous Carbon Nanostructure Production Method)

Note that fibrous carbon nanostructures having the properties set forth above can be efficiently produced by, in a method in which during synthesis of fibrous carbon nanostructures through CVD by supplying a feedstock compound and a carrier gas onto a substrate having a catalyst layer at the surface thereof, a trace amount of an oxidizing agent (catalyst activating material) is provided in the system to dramatically improve catalytic activity of the catalyst layer (for example, refer to WO 2006/011655 A1), forming the catalyst layer at the surface of the substrate by a wet process and using a feedstock gas containing ethylene (for example, a gas containing more than 10 volume % of ethylene), for example.

Formation of the catalyst layer at the surface of the substrate by a wet process can be carried out by, for example, applying a coating liquid A containing an aluminum compound onto the substrate, drying the coating liquid A to form an aluminum thin film (catalyst-supporting layer supporting iron thin film (catalyst layer)) on the substrate, further applying a coating liquid B containing an iron compound onto the aluminum thin film, and drying the coating liquid B to form an iron thin film (catalyst layer) on the aluminum thin film. Note that the term "aluminum thin film" refers to a thin film containing aluminum as a metal component, whereas the term "iron thin film" refers to a thin film containing iron as a metal component.

The substrate can be a substrate formed by a metal such as iron, nickel, chromium, molybdenum, tungsten, titanium, aluminum, manganese, cobalt, copper, silver, gold, platinum, niobium, tantalum, lead, zinc, gallium, indium, germanium, or antimony, a substrate formed by an alloy or an oxide of any of these metals, a substrate formed by a non-metal such as silicon, quartz, glass, mica, graphite, or diamond, or a substrate formed by a ceramic.

The coating liquid A can be a coating liquid obtained by dissolving or dispersing an organometallic compound or a metal salt that can form an alumina thin film as an aluminum thin film in an organic solvent.

Examples of organometallic compounds that can form an alumina thin film include aluminum alkoxides such as aluminum trimethoxide, aluminum triethoxide, aluminum tri-n-propoxide, aluminum tri-i-propoxide, aluminum tri-n-butoxide, aluminum tri-sec-butoxide, and aluminum tri-tert-butoxide. Other examples of aluminum-containing organometallic compounds include complexes such as tris(acetylacetonato)aluminum(III). Examples of metal salts that can form an alumina thin film include aluminum sulfate, aluminum chloride, aluminum nitrate, aluminum bromide, aluminum iodide, aluminum lactate, basic aluminum chloride, and basic aluminum nitrate. Various organic solvents such as alcohols, glycols, ketones, ethers, esters, and hydrocarbons can be used as the organic solvent. These examples can be used individually or as a mixture.

A stabilizer may be added to the coating liquid A in order to suppress a condensation polymerization reaction of the organometallic compound and the metal salt. The stabilizer is preferably at least one selected from the group consisting of β-diketones and alkanolamines. Examples of β-diketones that can be used include acetylacetone, methyl acetoacetate, ethyl acetoacetate, benzoylacetone, dibenzoylmethane, benzoyltrifluoroacetone, furoylacetone, and trifluoroacetylacetone, with acetylacetone and ethyl acetoacetate being particularly preferable. Examples of alkanolamines that can be used include monoethanolamine, diethanolamine, triethanolamine, N-methyldiethanolamine, N-ethyldiethanolamine, N,N-dimethylaminoethanol, diisopropanolamine, and triisopropanolamine, with a secondary or tertiary alkanolamine being preferable.

The coating liquid B can be a coating liquid obtained by dissolving or dispersing an organometallic compound or a metal salt that can form an iron thin film in an organic solvent.

Examples of organometallic compounds that can form an iron thin film include iron pentacarbonyl, ferrocene, iron(II) acetylacetonate, iron(III) acetylacetonate, iron(II) trifluoroacetylacetonate, and iron(III) trifluoroacetylacetonate. Examples of metal salts that can form an iron thin film include inorganic acid iron salts such as iron sulfate, iron nitrate, iron phosphate, iron chloride, and iron bromide, and organic acid iron salts such as iron acetate, iron oxalate, iron citrate, and iron lactate. These examples can be used individually or as a mixture.

The organic solvent contained in the coating liquid B is not specifically limited and can be any of the same organic solvents as can be used in the previously described coating liquid A. Moreover, the coating liquid B may contain any of the same stabilizers as can be used in the previously described coating liquid A.

Application and drying of the coating liquids A and B described above can be performed by known techniques.

(Surface Modification Treatment)

The presently disclosed fibrous carbon nanostructures are easy to surface modify when subjected to surface modification treatment such as oxidation treatment.

The surface modification treatment of the presently disclosed fibrous carbon nanostructures can be carried out without any specific limitations using a surface modifying agent such as nitric acid, sulfuric acid, a mixed acid of nitric acid and sulfuric acid, ozone, fluorine gas, or hydrogen peroxide, for example. Of these examples, the surface modification treatment of the presently disclosed fibrous carbon nanostructures is preferably performed using nitric acid, sulfuric acid, or a mixed acid of nitric acid and sulfuric acid, and is more preferably performed using a mixed acid of nitric acid and sulfuric acid from a viewpoint of obtaining surface-modified fibrous carbon nanostructures having excellent dispersibility. The surface modification treatment conditions can be set in accordance with the type of surface modifying agent that is used and the desired properties of the surface-modified fibrous carbon nanostructures.

The surface-modified fibrous carbon nanostructures obtained through surface modification treatment of the presently disclosed fibrous carbon nanostructures can, without any specific limitations, be well dispersed in a dispersion medium such as water without using a dispersant, for example. Moreover, the resultant fibrous carbon nanostructure dispersion liquid can be used in production of various shaped products (for example, antistatic films, transparent conductive films, etc.).

Note that in a case in which the properties of fibrous carbon nanostructures that are to be subjected to surface modification treatment are unknown (i.e., in a case in which it is not known whether the fibrous carbon nanostructures correspond to the presently disclosed fibrous carbon nanostructures), it is preferable that the presently disclosed method of evaluating a fibrous carbon nanostructure described below is used to evaluate the fibrous carbon nanostructures, and that fibrous carbon nanostructures judged to be of good quality are then subjected to surface modification treatment to produce surface-modified fibrous carbon nanostructures. By performing surface modification treatment with respect to fibrous carbon nanostructures that are judged to be of good quality, it is possible to obtain surface-modified fibrous carbon nanostructures that have been well surface modified.

(Fibrous Carbon Nanostructure Evaluation Method)

The presently disclosed method of evaluating a fibrous carbon nanostructure includes: a step (A) of performing thermogravimetric analysis of a fibrous carbon nanostructure in a dry air atmosphere to obtain a first derivative curve of a thermogravimetric curve; a step (B) of determining a symmetry factor of a peak of the first derivative curve of the thermogravimetric curve obtained in step (A); and a step of judging the fibrous carbon nanostructure to be of good quality in a case in which the symmetry factor determined in step (B) is 3.70 or less and judging the fibrous carbon nanostructure to be of poor quality in a case in which the symmetry factor is more than 3.70. By judging fibrous carbon nanostructures for which the symmetry factor is 3.70 or less to be of good quality in this manner, it is possible to suitably evaluate and sort fibrous carbon nanostructures that are easy to surface modify.

Note that the peak symmetry factor serving as a standard for judging whether a fibrous carbon nanostructure is of good quality or poor quality is preferably 3.30 or less, more preferably 2.60 or less, and even more preferably 2.00 or less, and is preferably 0.50 or more, more preferably 0.70 or more, and even more preferably 0.80 or more. When the symmetry factor of the peak of the first derivative curve is within any of the ranges set forth above, this means that surface modification is even easier when surface modification treatment such as oxidation treatment is performed. The thermogravimetric curve may be a thermogravimetric curve having mass on a vertical axis and temperature on a horizontal axis or may be a thermogravimetric curve having mass on a vertical axis and time on a horizontal axis. Moreover, the first derivative curve of the thermogravimetric curve may be a temperature derivative curve having a derivative thermogravimetric (DTG) value on a vertical axis and temperature on a horizontal axis or may be a time derivative curve having a derivative thermogravimetric (DTG) value on a vertical axis and time on a horizontal axis.

EXAMPLES

The following provides a more specific description of the present disclosure based on examples. However, the present disclosure is not limited to the following examples. In the following description, "%" used to express quantities is by mass, unless otherwise specified.

In the examples and comparative example, the following methods were used to measure or evaluate the G/D ratio, average diameter, t-plot, total specific surface area, internal specific surface area, carbon purity, symmetry factor of a peak of a first derivative curve of a thermogravimetric curve, and surface modification treatability of fibrous carbon nanostructures including CNTs.

<G/D Ratio>

A micro laser Raman system (Nicolet Almega XR produced by Thermo Fisher Scientific) was used to measure fibrous carbon nanostructures in proximity to the center of a substrate.

<Average Diameter>

The diameters (external diameters) of 20 randomly selected fibrous carbon nanostructures were measured from an image obtained using a transmission electron microscope, and a number-average value of the measured diameters was calculated.

<t-Plot, Total Specific Surface Area, and Internal Specific Surface Area>

Measurement was performed using a BET specific surface area measurement apparatus (BELSORP®-mini produced by Bel Japan Inc.).

<Carbon Purity>

Fibrous carbon nanostructures were heated to 800° C. in air using a thermogravimetric (TG) analyzer, and the carbon purity was calculated from the mass loss in this heating (carbon purity=(mass loss through combustion up until 800° C. is reached/initial mass)×100(%)).

<Symmetry Factor>

A simultaneous thermogravimetric/differential thermal analyzer (produced by Bruker AXS; product name: TG-DTA2020SA) was used to measure a thermogravimetric curve for fibrous carbon nanostructures under conditions of a heating rate of 5° C./min and a dry air flow rate of 200 mL/min and to obtain a first derivative curve.

[Temperature Derivative Curve]

Figure 1A:
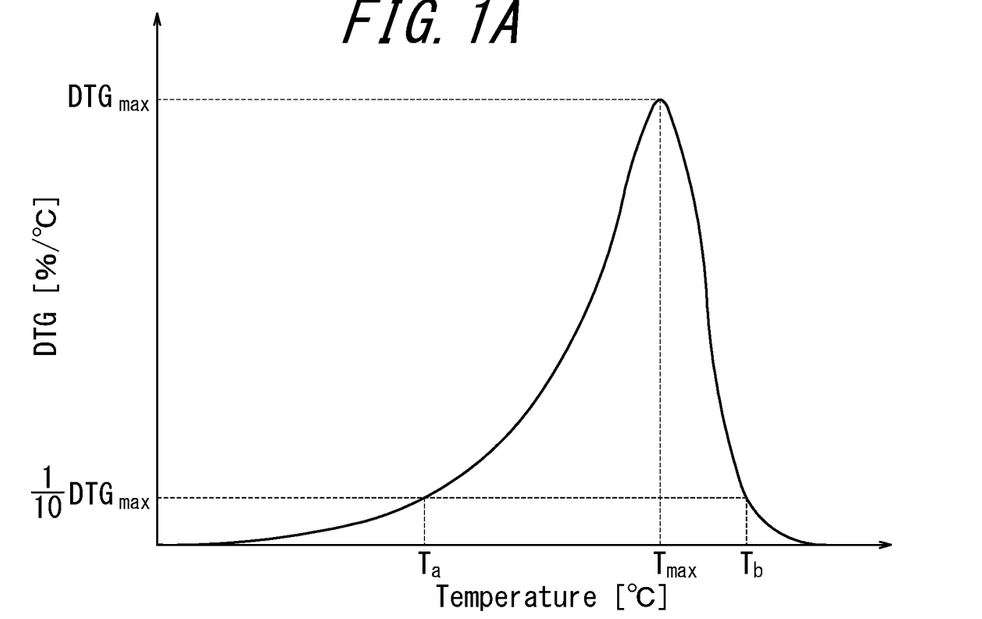
FIG. 1A is a graph schematically illustrating the shape of a peak of a first derivative curve of a thermogravimetric curve for a case in which the first derivative curve is a temperature derivative curve.

In a case in which the vertical axis of the thermogravimetric curve was mass and the horizontal axis of the thermogravimetric curve was temperature and in which the first derivative curve was a temperature derivative curve having a derivative thermogravimetric (DTG) value on the vertical axis and temperature on the horizontal axis such as illustrated in FIG. 1A, for example, a symmetry factor $W_a/W_b$ of a DTG peak for the fibrous carbon nanostructures was calculated from a peak of the temperature derivative curve by the following formula (1).

$$W_a/W_b=(T_{max}-T_a)/(T_b-T_{max}) \quad (1)$$

$T_{max}$: Peak top temperature
$DTG_{max}$: Derivative thermogravimetric value at temperature $T_{max}$
$T_a$: Temperature at which derivative thermogravimetric value is 1/10 of $DTG_{max}$ (low-temperature side)
$T_b$: Temperature at which derivative thermogravimetric value is 1/10 of $DTG_{max}$ (high-temperature side; $T_b>T_a$)

[Time Derivative Curve]

Figure 1B:
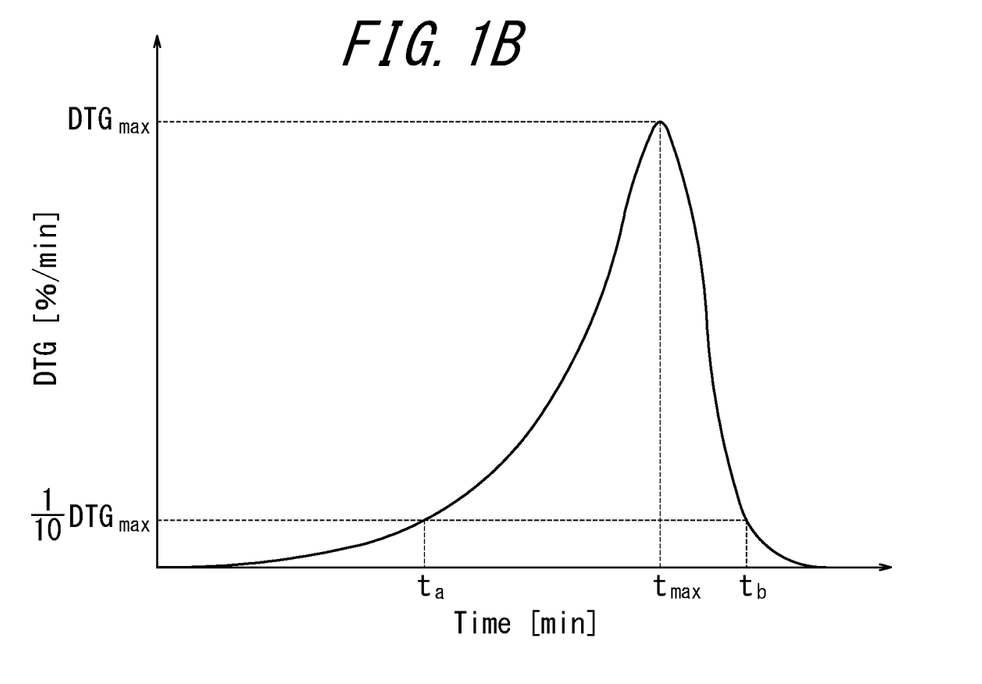
FIG. 1B is a graph schematically illustrating the shape of a peak of a first derivative curve of a thermogravimetric curve for a case in which the first derivative curve is a time derivative curve.
Figure 2:
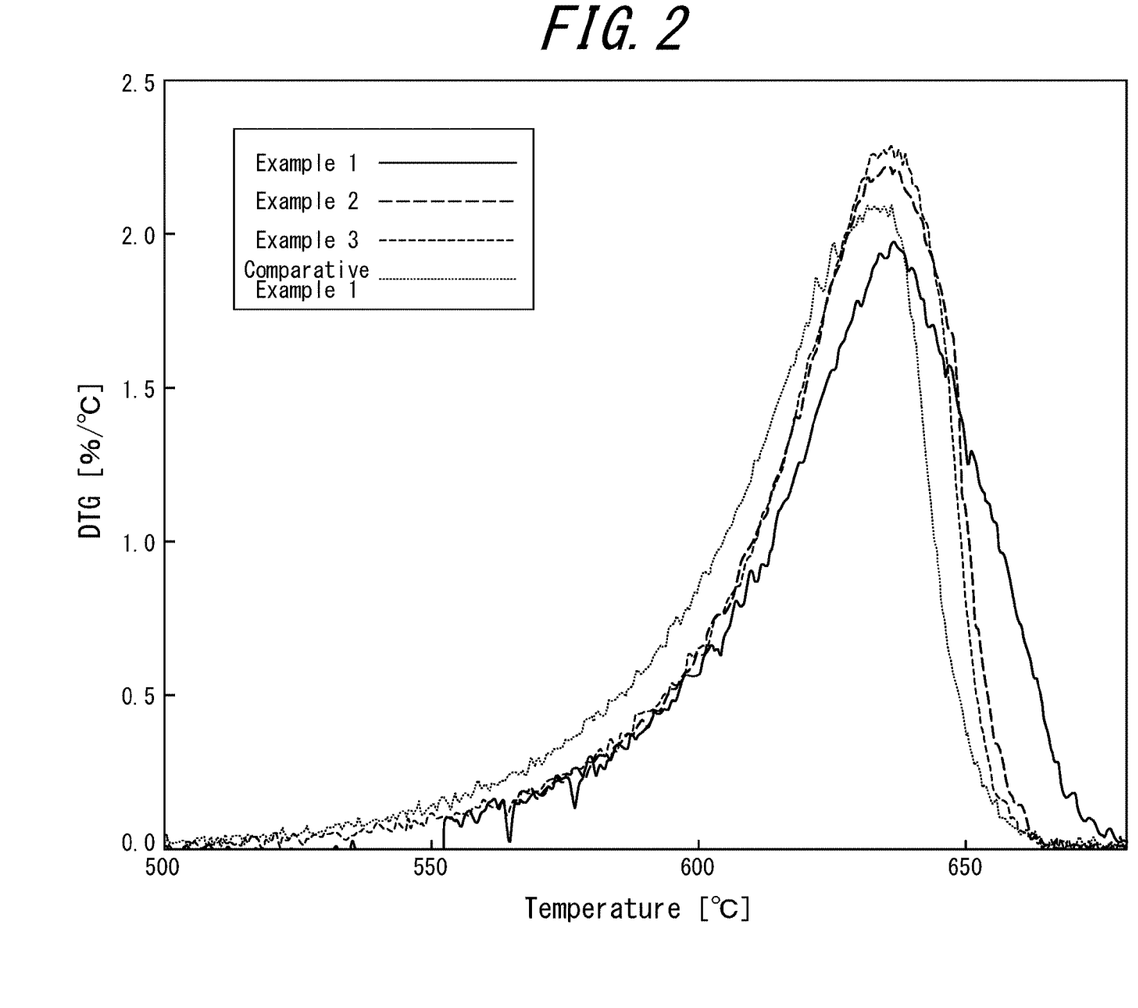
FIG. 2 is a graph illustrating first derivative curves of thermogravimetric curves for fibrous carbon nanostructures in examples and a comparative example.

In a case in which the vertical axis of the thermogravimetric curve was mass and the horizontal axis of the thermogravimetric curve was time and in which the first derivative curve was a time derivative curve having a derivative thermogravimetric (DTG) value on the vertical axis and time on the horizontal axis such as illustrated in FIG. 1B, for example, a symmetry factor $W_a/W_b$ of a DTG peak for the fibrous carbon nanostructures was calculated from a peak of the time derivative curve by the following formula (2).

$$W_d/W_b = (t_{max} - t_a)/(t_b - t_{max}) \quad (2)$$

$t_{max}$: Peak top time
$DTG_{max}$: Derivative thermogravimetric value at time $t_{max}$
$t_a$: Time at which derivative thermogravimetric value is 1/10 of $DTG_{max}$ (short-time side)
$t_b$: Temperature at which derivative thermogravimetric value is 1/10 of $DTG_{max}$ (long-time side; $t_b > t_a$)

<Surface Modification Treatability>

A 300 mL flask including a condenser and an impeller was charged with 0.80 g of obtained fibrous carbon nanostructures, 54.8 g of deionized water, and 83 mL of a mixed acid containing sulfuric acid (produced by Wako Pure Chemical Industries, Ltd.; concentration: 96% to 98%) and nitric acid (produced by Wako Pure Chemical Industries, Ltd.; concentration: 69% to 70%) in a ratio of 1:3 (volume ratio). The flask was then heated under stirring at an internal temperature of 110° C. for 8 hours.

Thereafter, 3.0 g of a liquid of fibrous carbon nanostructures and mixed acid obtained after mixed acid treatment was measured into a 50 mL sample bottle and was diluted through addition of 27.0 g of deionized water. Supernatant was removed and then the liquid volume was adjusted to 30 mL through addition of deionized water. The pH was adjusted to 7.0 through addition of ammonia water of 0.1% in concentration and then an ultrasonic irradiation apparatus (produced by Branson; product name: BRANSON 5510) was used to perform ultrasonic irradiation for 50 minutes at a frequency of 42 Hz to obtain a dispersion liquid of fibrous carbon nanostructures.

[Evaluation of Dispersion Liquid]

The obtained dispersion liquid was subjected to three cycles of centrifugal separation for 40 minutes at 20,000 G and collection of supernatant using a centrifuge (produced by Beckman Coulter Inc.; product name: OPTIMA XL100K) to obtain 20 mL of a dispersion liquid of fibrous carbon nanostructures that had undergone centrifugal separation. The obtained dispersion liquid was checked by eye for the presence of aggregates.

In addition, a spectrophotometer (produced by JASCO Corporation; product name: V670) was used to measure light absorbance Ab1 (optical path length: 1 cm; wavelength: 550 nm) of the dispersion liquid prior to treatment in the centrifuge and light absorbance Ab2 (optical path length: 1 cm; wavelength: 550 nm) of the dispersion liquid after treatment in the centrifuge. Dispersibility of the fibrous carbon nanostructures was evaluated by calculating the rate of decrease in light absorbance due to centrifugal separation by the following formula. A smaller rate of decrease in light absorbance indicates that the fibrous carbon nanostructures have been well surface modified and that dispersibility of the fibrous carbon nanostructures is excellent.

Rate of light absorbance decrease (%) = {1 − (Ab2/Ab1)} × 100

[Evaluation of Shaped Product (Film)]

The obtained dispersion liquid was applied onto a glass base plate by a #2 bar coater and was then dried at 130° C. for 10 minutes to form a film composed of fibrous carbon nanostructures on the glass base plate.

Dispersibility of the fibrous carbon nanostructures was evaluated by observing the obtained film using an optical microscope (×100 magnification) and checking whether visible clumps (30 μm or more in diameter) of fibrous carbon nanostructures were present in the field of view of the microscope. A smaller number of clumps of fibrous carbon nanostructures indicates that the fibrous carbon nanostructures have been well surface modified and that dispersibility of the fibrous carbon nanostructures is excellent.

Example 1

<Production of Catalyst Substrate>

A coating liquid A was prepared by dissolving 0.19 kg of aluminum tri-sec-butoxide in 10 L (7.8 kg) of 2-propanol and then adding and dissolving 0.09 kg of triisopropanolamine as a stabilizer. In addition, a coating liquid B was prepared by dissolving 174 mg of iron acetate in 10 L (7.8 kg) of 2-propanol and then adding and dissolving 0.019 kg of triisopropanolamine as a stabilizer.

The coating liquid A described above was applied onto the surface of an SUS 430 base plate made from Fe—Cr alloy serving as a flat plate-shaped substrate so as to form an alumina thin film (catalyst-supporting layer) of 40 nm in thickness. Next, the coating liquid B described above was applied onto the alumina thin film that had been formed on the substrate so as to obtain a catalyst substrate including an iron thin film of 3 nm in thickness.

<Synthesis of Fibrous Carbon Nanostructures>

A formation step (reduction step), a synthesis step, and a cooling step were performed continuously with respect to the catalyst substrate described above in order to synthesize an aligned assembly of fibrous carbon nanostructures (fibrous carbon nanostructures including CNTs). Note that in the synthesis step, a feedstock gas (composition (by volume): 20% ethylene; 55 ppm to 440 ppm $H_2O$; remainder $N_2$) was supplied to the catalyst substrate at a flow rate of 150 sLm.

The obtained fibrous carbon nanostructures including CNTs had a G/D ratio of 3.7, an average diameter of 4 nm, and a carbon purity of 99.9%, and in measurement thereof by a Raman spectrophotometer, a radial breathing mode (RBM) peak was observed in a low-wavenumber region of 100 $cm^{-1}$ to 300 $cm^{-1}$, which is characteristic of single-walled carbon nanotubes. Moreover, a t-plot for the fibrous carbon nanostructures obtained from an adsorption isotherm was bent in a convex upward shape. Also note that the position of the bending point was t=0.7 nm, the total specific surface area S1 was 1,270 $m^2/g$, the internal specific surface area S2 was 290 $m^2/g$, and S2/S1 was 0.23.

Furthermore, the symmetry factor of a peak of a first derivative curve of a thermogravimetric curve and the surface modification treatability of the obtained fibrous carbon nanostructures were evaluated. The results are shown in Table 1. Note that the peak symmetry factor was determined from a temperature derivative curve of the thermogravimetric curve.

Example 2

An aligned assembly of fibrous carbon nanostructures (fibrous carbon nanostructures including CNTs) was synthesized in the same way as in Example 1 with the exception that the concentration of ethylene in the synthesis step was changed to 17%.

The obtained fibrous carbon nanostructures including CNTs had a G/D ratio of 2.9, an average diameter of 4 nm, and a carbon purity of 99.9%, and in measurement thereof by a Raman spectrophotometer, a radial breathing mode (RBM) peak was observed in a low-wavenumber region of 100 $cm^{-1}$ to 300 $cm^{-1}$, which is characteristic of single-walled carbon nanotubes. Moreover, a t-plot for the fibrous carbon nanostructures obtained from an adsorption isotherm was bent in a convex upward shape. Also note that the position of the bending point was t=0.7 nm, the total specific surface area S1 was 1,130 m$^2$/g, the internal specific surface area S2 was 240 m$^2$/g, and S2/S1 was 0.21.

Furthermore, the symmetry factor of a peak of a first derivative curve of a thermogravimetric curve and the surface modification treatability of the obtained fibrous carbon nanostructures were evaluated. The results are shown in Table 1. Note that the peak symmetry factor was determined from a temperature derivative curve of the thermogravimetric curve.

Example 3

An aligned assembly of fibrous carbon nanostructures (fibrous carbon nanostructures including CNTs) was synthesized in the same way as in Example 1 with the exception that the concentration of ethylene in the synthesis step was changed to 14%.

The obtained fibrous carbon nanostructures including CNTs had a G/D ratio of 2.8, an average diameter of 4 nm, and a carbon purity of 99.9%, and in measurement thereof by a Raman spectrophotometer, a radial breathing mode (RBM) peak was observed in a low-wavenumber region of 100 cm$^{-1}$ to 300 cm$^{-1}$, which is characteristic of single-walled carbon nanotubes. Moreover, a t-plot for the fibrous carbon nanostructures obtained from an adsorption isotherm was bent in a convex upward shape. Also note that the position of the bending point was t=0.7 nm, the total specific surface area S1 was 1,240 m$^2$/g, the internal specific surface area S2 was 230 m$^2$/g, and S2/S1 was 0.19.

Furthermore, the symmetry factor of a peak of a first derivative curve of a thermogravimetric curve and the surface modification treatability of the obtained fibrous carbon nanostructures were evaluated. The results are shown in Table 1. Note that the peak symmetry factor was determined from a temperature derivative curve of the thermogravimetric curve.

Comparative Example 1

An aligned assembly of fibrous carbon nanostructures (fibrous carbon nanostructures including CNTs) was synthesized in the same way as in Example 1 with the exception that the concentration of ethylene in the synthesis step was changed to 10%.

The obtained fibrous carbon nanostructures including CNTs had a G/D ratio of 3.4, an average diameter of 4 nm, and a carbon purity of 99.9%, and in measurement thereof by a Raman spectrophotometer, a radial breathing mode (RBM) peak was observed in a low-wavenumber region of 100 cm$^{-1}$ to 300 cm$^{-1}$, which is characteristic of single-walled carbon nanotubes. Moreover, a t-plot for the fibrous carbon nanostructures obtained from an adsorption isotherm was bent in a convex upward shape. Also note that the position of the bending point was t=0.7 nm, the total specific surface area S1 was 1,320 m$^2$/g, the internal specific surface area S2 was 55 m$^2$/g, and S2/S1 was 0.04.

Furthermore, the symmetry factor of a peak of a first derivative curve of a thermogravimetric curve and the surface modification treatability of the obtained fibrous carbon nanostructures were evaluated. The results are shown in Table 1. Note that the peak symmetry factor was determined from a temperature derivative curve of the thermogravimetric curve.

TABLE 1

| | Ethylene concentration in synthesis step [%] | Symmetry factor $W_a/W_b$ [—] | Rate of light absorbance decrease [%] | Aggregates in dispersion liquid | Clumps in film |
|---|---|---|---|---|---|
| Example 1 | 20 | 1.86 | 25 | No | No |
| Example 2 | 17 | 2.56 | 33 | No | No |
| Example 3 | 14 | 3.30 | 46 | No | No |
| Comparative Example 1 | 10 | 3.74 | 61 | Yes | Yes |

It can be seen from Table 1 that the fibrous carbon nanostructures of Examples 1 to 3 were well surface modified and had excellent dispersibility compared to the fibrous carbon nanostructures of Comparative Example 1.

INDUSTRIAL APPLICABILITY

According to the present disclosure, it is possible to provide a fibrous carbon nanostructure that is easy to surface modify.

Moreover, according to the present disclosure, it is possible to provide a surface-modified fibrous carbon nanostructure that has been well surface modified.

The invention claimed is:

1. A fibrous carbon nanostructure comprising a carbon nanotube, for which a symmetry factor of a peak of a first derivative curve of a thermogravimetric curve obtained by thermogravimetric analysis in a dry air atmosphere is 3.70 or less, and a ratio of G band peak intensity relative to D band peak intensity in a Raman spectrum is not less than 0.5 and not more than 5.0.

2. The fibrous carbon nanostructure according to claim 1, wherein the first derivative curve is a temperature derivative curve or a time derivative curve of the thermogravimetric curve.

3. The fibrous carbon nanostructure according to claim 1, wherein a t-plot for the fibrous carbon nanostructure obtained from an adsorption isotherm exhibits a convex upward shape.

4. The fibrous carbon nanostructure according to claim 3, wherein the t-plot has a bending point within a range of 0.2≤t(nm)≤1.5.

5. The fibrous carbon nanostructure according to claim 1, wherein total specific surface area S1 and internal specific surface area S2 of the fibrous carbon nanostructure obtained from a t-plot obtained from an adsorption isotherm satisfy a relationship 0.05≤S2/S1≤0.30.

6. The fibrous carbon nanostructure according to claim 1, wherein the carbon nanotube is a single-walled carbon nanotube.

7. A method of evaluating a fibrous carbon nanostructure comprising:
performing thermogravimetric analysis of a fibrous carbon nanostructure in a dry air atmosphere to obtain a first derivative curve of a thermogravimetric curve;
determining a symmetry factor of a peak of the first derivative curve of the thermogravimetric curve; and
judging the fibrous carbon nanostructure to be of good quality in a case in which the symmetry factor is 3.70 or less and judging the fibrous carbon nanostructure to be of poor quality in a case in which the symmetry factor is more than 3.70.

8. A method of producing a surface-modified fibrous carbon nanostructure comprising:

performing fibrous carbon nanostructure evaluation using the method of evaluating a fibrous carbon nanostructure according to claim 7; and performing surface modification treatment of a fibrous carbon nanostructure that is judged to be of good quality to obtain a surface-modified fibrous carbon nanostructure.

\* \* \* \* \*